US011458533B2

(12) United States Patent
Chung et al.

(10) Patent No.: US 11,458,533 B2
(45) Date of Patent: Oct. 4, 2022

(54) MEASURING DEVICE AND METHOD OF PHYSICAL PROPERTY MEASURING

(71) Applicant: National Central University, Taoyuan (TW)

(72) Inventors: Chih-Ang Chung, Taoyuan (TW); Ya-Huan Lee, Taoyuan (TW); Tsung-Han Chuang, Taoyuan (TW); Tsung-Hsuan Chiang, Taoyuan (TW); Chih-Shan Yen, Taoyuan (TW); Jeng-Rong Ho, Taoyuan (TW); Jason Shian-Ching Jang, Taoyuan (TW)

(73) Assignee: National Central University, Taoyuan (TW)

( * ) Notice: Subject to any disclaimer, the term of this patent is extended or adjusted under 35 U.S.C. 154(b) by 233 days.

(21) Appl. No.: 17/009,792

(22) Filed: Sep. 2, 2020

(65) Prior Publication Data
US 2021/0060637 A1 Mar. 4, 2021

(30) Foreign Application Priority Data

Sep. 4, 2019 (TW) .................................. 108131929

(51) Int. Cl.
*B22D 2/00* (2006.01)
*G01N 11/04* (2006.01)
(Continued)

(52) U.S. Cl.
CPC .............. *B22D 2/008* (2013.01); *G01N 9/32* (2013.01); *G01N 11/04* (2013.01); *G01N 13/02* (2013.01);
(Continued)

(58) Field of Classification Search
CPC .......... B22D 2/008; G01N 9/32; G01N 11/04; G01N 13/02; G01N 2013/0225; G01N 2013/0283
See application file for complete search history.

(56) References Cited

U.S. PATENT DOCUMENTS 3,074,266 A * 1/1963 Sadler .................... G01N 11/06
73/54.13
4,359,211 A 11/1982 Baumert
(Continued)

FOREIGN PATENT DOCUMENTS

EP 1205736 A2 5/2002
JP 2012051963 A * 3/2012
(Continued)

OTHER PUBLICATIONS

Steven J. Roach et al., "A new method to dynamically measure the surface tension, viscosity, and density of melts," Metallurgical and Materials Transactions B, Oct. 2005, vol. 36B, pp. 667-676.

*Primary Examiner* — John Fitzgerald
(74) *Attorney, Agent, or Firm* — CKC & Partners Co., LLC

(57) ABSTRACT

A measuring device includes a furnace, a draining vessel, a loader and a computing system for physical properties. The draining vessel with molten metal fluid is in the furnace. The loader accumulates the molten metal fluid from the draining vessel. The computing system includes a recording unit, transform unit, computing unit and processor. The recording unit records the vessel information. By the assumed physical parameters and the vessel information, the transform unit transforms a weight of the molten metal fluid in the loader into a first length criterion, and the computing unit simulates the flowing of the molten metal fluid to have a second length criterion. The processor minimizes the difference of the first and the second length criterion by changing the assumed (Continued)

physical parameters. The physical properties of the molten metal fluid are determined when the difference is minimized.

10 Claims, 5 Drawing Sheets

(51) Int. Cl.
  *G01N 9/32* (2006.01)
  *G01N 13/02* (2006.01)
(52) U.S. Cl.
  CPC ............... *G01N 2013/0225* (2013.01); *G01N 2013/0283* (2013.01)

(56) References Cited

U.S. PATENT DOCUMENTS

| | | | |
|---|---|---|---|
| 5,251,498 A | 10/1993 | Nakatsukasa et al. | |
| 6,539,805 B2 | 4/2003 | Heaslip et al. | |
| 2007/0227234 A1* | 10/2007 | Weisinger | G01N 11/06 73/54.13 |

FOREIGN PATENT DOCUMENTS

| | | | | |
|---|---|---|---|---|
| KR | 101495219 B1 * | 2/2015 | | |
| TW | I482965 B | 5/2015 | | |
| TW | I635258 B | 9/2018 | | |
| WO | WO-2013037674 A1 * | 3/2013 | ............. | G01N 11/06 |
| WO | WO-2013037691 A * | 3/2013 | ............. | G01N 11/06 |

* cited by examiner

MEASURING DEVICE AND METHOD OF PHYSICAL PROPERTY MEASURING

RELATED APPLICATIONS

This application claims priority to Taiwan Application Serial Number 108131929, filed Sep. 4, 2019, which is herein incorporated by reference in its entirety.

BACKGROUND

Field of Disclosure

This disclosure relates to a measuring device and a method of physical property measuring. The measured physical properties include a density, a viscosity and a surface tension.

Description of Related Art

The measurement of the basic physical properties of fluids has always been a constantly improving technology in engineering. In early development, according to Bernoulli's Principle, physical properties of fluids (e.g. density of the fluid) can be obtained by experiments with designed flow for the fluids.

Metal materials melt into molten fluid at high temperature, and the basic physical properties of molten fluid are also of interest to people. However, the molten fluid is easy to damage the measuring equipment, and the molten fluid has considerable viscosity. Bernoulli's principle is not applicable for the molten fluid of metal materials. Therefore, the establishment of a simple and easy-to-maintain measuring device for physical property measuring and a corresponding measuring method for a high-viscosity molten metal fluid are subjects of interest.

SUMMARY

One aspect of the present disclosure is a measuring device used to measure physical properties of molten metal fluid.

According to one embodiment of the present disclosure, a measuring device for measuring physical properties of a molten metal fluid includes a furnace, a draining vessel, a loader and a computing system. The furnace has a chamber. The draining vessel is located in the chamber and has an opening. The draining vessel is configured to accumulate the molten metal fluid. The loader is aligned with the opening to accumulate the molten metal fluid from the draining vessel during a time period. The computing system is used for providing the physical properties. The computing system includes a recording unit, a transform unit, a computing unit and a processor. The recording unit records a vessel information of the draining vessel. The transform unit is configured to transform a weight of the molten metal fluid accumulated in the loader during the time into a first length criterion. The computing unit is configured to simulate flowing of the molten metal fluid to have a second length criterion by assumed physical parameters and the vessel information. The processor configured to minimize a difference function of the first and the second length criterions by changing the assumed physical parameters. Current physical parameters of the assumed physical parameters are determined as the physical properties of the molten metal fluid when the difference function is minimized.

In one or more embodiment of the present disclosure, the assumed physical parameters of the molten metal fluid comprising a density, a viscosity and a surface tension.

In one or more embodiment of the present disclosure, the vessel information includes a cross-section area of the draining vessel. A cross-section area of the opening and a length of the opening.

In one or more embodiment of the present disclosure, the computing unit is a computational fluid dynamics unit. The computational fluid dynamics unit provides the second length criterion by a computational fluid dynamics algorithm.

In one or more embodiment of the present disclosure, the first and second length criterions are a first height head and a second height head respectively. The first and second height head are functions of the time, the first height head is a liquid level transformed by the weight of the molten metal fluid in the draining vessel. The second height head is another liquid level of the molten metal fluid in the draining vessel, and the second height head is simulated by the computing unit.

In one or more embodiment of the present disclosure, the mentioned measuring device further includes a weight measuring device. The loader is located on the weight measuring device. The loader and the weight measuring device are located out of the chamber. The chamber includes a channel, and the opening is aligned with the loader by the channel.

In one or more embodiment of the present disclosure, a heat insulation plate is located between the weight measuring device and the loader.

Another aspect of the present disclosure is a method of physical property measuring. The method of physical property measuring includes following operations. Provide a draining vessel and recording a vessel information of the draining vessel. Place metal to be measured in the draining vessel. Heat the metal to be measured to melt it into molten metal fluid. Make the molten metal fluid flow out of the draining vessel and be accumulated in a loader during a time period to obtain a weight of the molten metal fluid. Provide assumed physical parameters. Transform the weight of the molten metal fluid in the loader into a first length criterion in the draining vessel by a transform unit according to the assumed physical parameters and the vessel information. Simulate flowing of the molten metal fluid by the assumed physical parameters to have a second length criterion in the draining vessel by a computing unit according to the assumed physical parameters and the vessel information. Compute a difference function formed by the difference of the first and second length criterions. Minimize the difference function by the processor, wherein current physical parameters of the assumed physical parameters are selected as physical properties of the molten metal fluid when the difference function is minimized.

In one or more embodiment of the present disclosure, the first and second length criterions are a first height head and a second height head respectively, the first and second height head are functions of the time, the first height head is a liquid level transformed by the weight of the molten metal fluid in the draining vessel. The second height head is another liquid level of the molten metal fluid in the draining vessel, and the second height head is simulated by the computing unit.

In one or more embodiment of the present disclosure, the assumed physical parameters of the molten metal fluid comprising a density, a viscosity and a surface tension. The mentioned method of physical property measuring further includes following operations. Divide the time period into first, second and third time periods sequentially and computing corresponding first, second and third difference functions of the difference function according to the first and second height heads, wherein the first time period precedes the second time period, and the second time period precedes the third time period. The mentioned operation of minimizing the difference function by the processor further includes following operations. Minimize the first difference function to select the density of the molten metal fluid. Minimize the second difference function to select the viscosity of the molten metal fluid. Minimize the third difference function to select the surface tension of the molten metal fluid.

In summary, the present disclosure provides a physical property measuring device with a simple structure and a corresponding measuring method under consideration of high-temperature viscosity molten metal fluid. The measuring device of the present disclosure only needs the weight of molten metal fluid flowing out over time, and it is not necessary that the weight measuring device located in a furnace. Therefore, the heat demand for physical property of molten metal fluid is effectively reduced, and the costs can be also reduced. The method for physical property measuring further uses an optimization algorithm to obtain the physical properties of the molten metal fluid including density, viscosity, and surface tension at the same time.

The above description is only used to explain the problems to be solved by the present disclosure, the technical means for solving the problems and the produced effects. The specific details of the present disclosure are described in detail in the following embodiments and related drawings.

BRIEF DESCRIPTION OF THE DRAWINGS

The advantages of the present disclosure are to be understood by the following exemplary embodiments and with reference to the attached drawings. The illustrations of the drawings are merely exemplary embodiments and are not to be considered as limiting the scope of the present disclosure.

DETAILED DESCRIPTION

The following embodiments are disclosed with accompanying diagrams for detailed description. For illustration clarity, many details of practice are explained in the following descriptions. However, it should be understood that these details of practice do not intend to limit the present invention. That is, these details of practice are not necessary in parts of embodiments of the present invention. Furthermore, for simplifying the drawings, some of the conventional structures and elements are shown with schematic illustrations. Also, the same labels may be regarded as the corresponding components in the different drawings unless otherwise indicated. The drawings are drawn to clearly illustrate the connection between the various components in the embodiments, and are not intended to depict the actual sizes of the components.

In addition, terms used in the specification and the claims generally have their usual meaning as used in the field, in the context of the disclosure and in the context of the particular content unless particularly specified otherwise. Some terms used to describe the disclosure are discussed below or elsewhere in the specification to provide additional guidance related to the description of the disclosure to those in the art. As used herein, the terms "comprising," "including," "having," "containing," "involving," and the like are to be understood to be open-ended, i.e., to mean including but not limited to.

Figure 1:
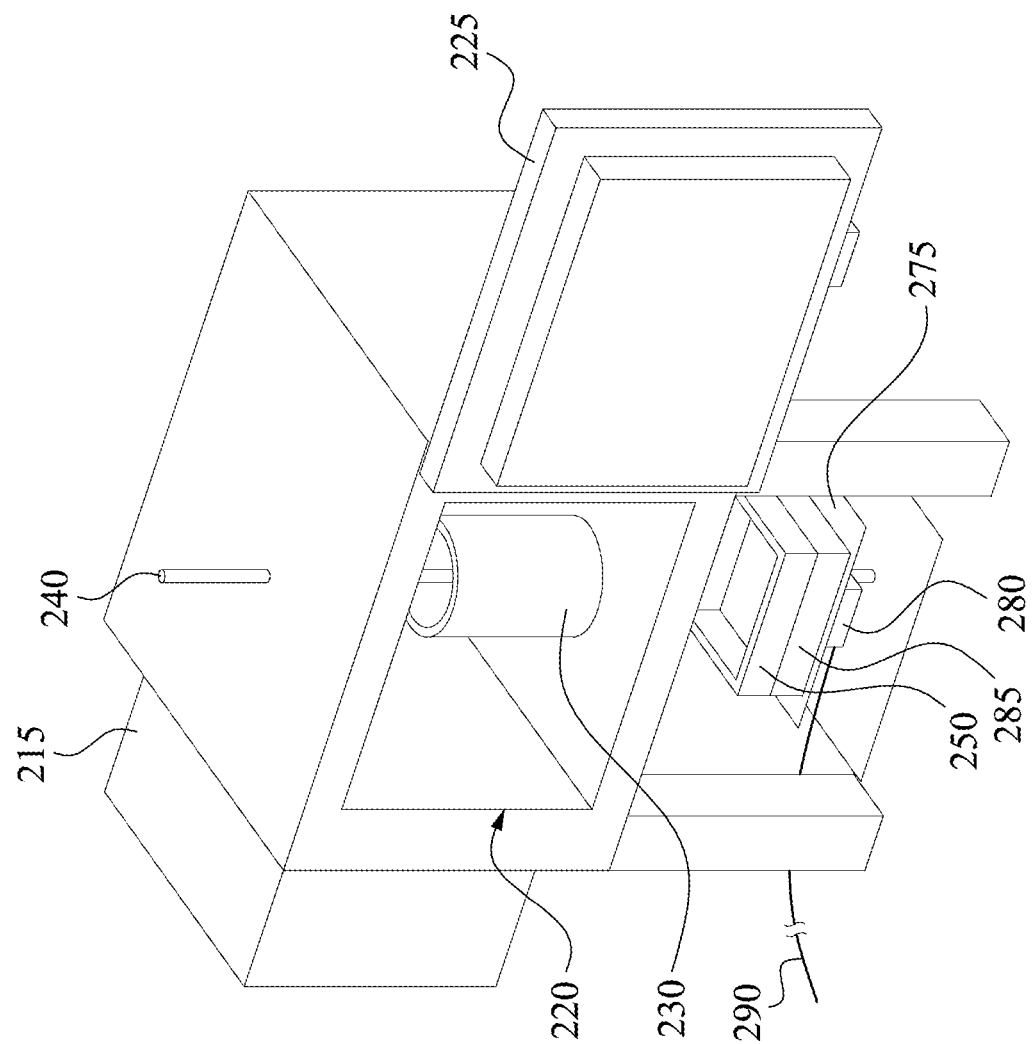
FIG. 1 illustrates a perspective view of a measuring device according to one embodiment of this disclosure.
Figure 2A:
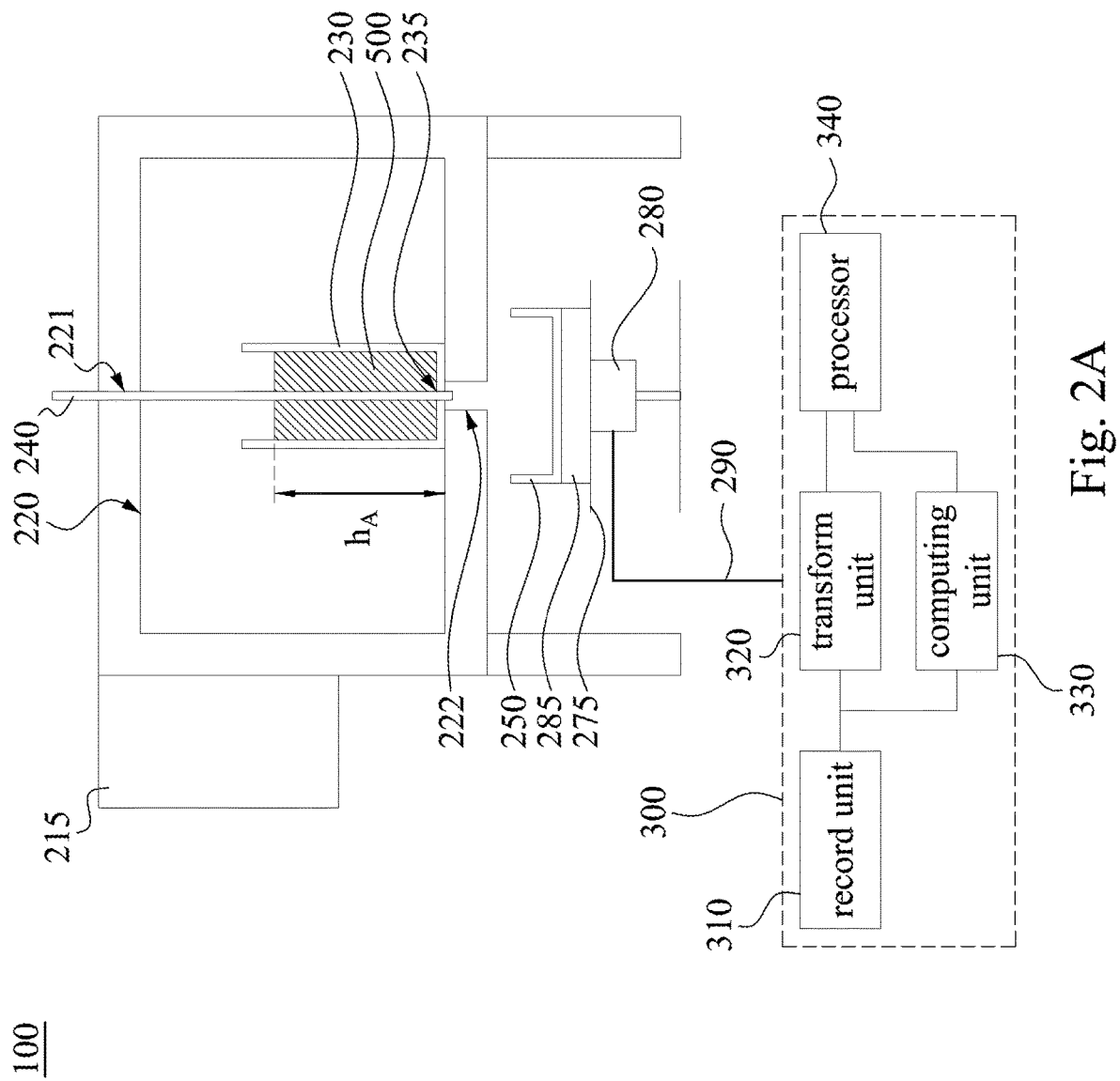
FIG. 2A illustrates a schematic view of a measuring device according to one embodiment of this disclosure.

FIG. 1 illustrates a perspective view of a measuring device 100 according to one embodiment of this disclosure. FIG. 2A illustrates a schematic view of a measuring device 100 according to one embodiment of this disclosure. Reference is made by FIGS. 1 and 2A, the composition of measuring device 100 for physical property is illustrated. In FIG. 1, the computing system 300 of the measuring device 100 for physical properties is omitted for the purpose of explanation. The details of the computing system 300 are illustrated in FIG. 2A.

As shown in FIG. 1, in this embodiment, the measuring device 100 for physical property includes a furnace 210, a draining vessel 230, a loader 250 and a weight measuring device 270. The furnace 210 includes a temperature control device 215, a chamber 220 and a door 225. The door 225 closes the chamber 220 to form a sealed space, and the temperature control device 215 can control the temperature in the chamber 220. The draining vessel 230 is located in the chamber 220, and the stopper 240 is located on the draining vessel 230 to further control the flow of fluid in the draining vessel 230.

In FIG. 1, the weight measuring device 270 and the loader 250 are located under the chamber 220 of the furnace 210. In this embodiment, the weight measuring device 270 includes a support frame 275 and a load cell 280. The load cell 280 is a force sensor used to convert the bearing pressure into an electronic signal. In FIG. 1, the support frame 275 is arranged on the load cell 280, and the loader 250 is located on the support frame 275. When the load cell 250 subsequently accumulates the fluid to be measured, a weight of the fluid to be measured can be converted by the load cell 280 into electronic signal, which is transmitted through the connection line 290 connected to the load cell 280 for subsequent calculations. It should be understood that the mentioned weight measuring device 270 is merely an example but not limited.

Return to FIG. 1, in this embodiment, there is a heat insulation plate 285 between the loader 250 and the support frame 275 of the weight measuring device 270. When the temperature of the fluid to be measured is quite high, the temperature of the loader 250 carrying the fluid to be measured will rise. Since the heat insulation plate 285 is located between the loader 250 and the support frame 275, the support frame 275 and the load cell 280 can be prevented from being directly damaged by high temperature. In some embodiments, the material of the heat insulation plate 285 includes Styrofoam, which is inexpensive and easy to obtain. In some embodiments, the heat insulation plate 285 can also be configured in the chamber 220 to reduce unexpected damage caused by contact of the chamber 220 and the draining vessel when the draining vessel 230 is placed in the chamber 220.

Please refer to FIG. 2A. In this embodiment, the measuring device 100 for physical properties includes a computing system 300 for physical properties. FIG. 2A illustrate one of the aspects of the measuring device 100 for physical properties with molten metal fluid 500 to be measured, and the computing system 300 for physical properties is connected to the load cell 180 through the connecting line 290.

The molten metal fluid 500 to be measured is located in the draining vessel 230. In FIG. 2A, the draining vessel 230 includes an opening 235, the chamber 220 has an upper channel 221 and a lower channel 222 connected to outside of the furnace 210, and the opening 235 is aligned with the loader 250 through the lower channel 222. Before the measurement of physical properties is officially started, the opening 235 of the draining vessel 230 is blocked by one end of the stopper 240. The other end of the stopper 240 is opposite to the blocking hole 235 and extends to the outside of the furnace 210 through the upper channel 221, and it facilitates the subsequent control of the flow of the molten metal fluid 500 through the stopper 240. In some embodiments, the material of the stopper 240 includes ceramic or other materials that are resistant to high temperature and is not easily thermally conductive.

In some embodiments, the molten metal fluid 500 to be measured is not necessarily located in the draining vessel 230 in the form of a fluid at the beginning of the measurement. Specifically, the metal to be measured can be solid at room temperature, its total weight can be measured first, and it can be placed in the draining vessel 230 manually. Subsequently, the draining vessel 230 is configured in the chamber 220, the door 225 is closed and seals the chamber 220 (refer to FIG. 1), the temperature in the sealed chamber 220 is adjusted by the temperature control device 215 to melt the metal into a molten metal fluid 500 to be measured, and kept at a specified temperature. The molten metal fluid 500 to be measured in the draining vessel 230 has a height $h_A$.

Return to FIG. 2A. As shown in the figure, the load cell 280 is connected to the computing system 300 for physical properties. In this embodiment, the computing system 300 for physical properties includes a recording unit 310, a transform unit 320, a computing unit 330 and a processor 340. After the molten metal fluid 500 flows from the draining vessel 230 to the loader 250, the flow information of the molten metal fluid 500 can be obtained. According to fluid dynamics, the computing system 300 for physical properties can obtain the physical properties of the molten metal fluid 500 in the chamber 220 of the furnace 210 through the flow information and the related simulation calculation.

Figure 2B:
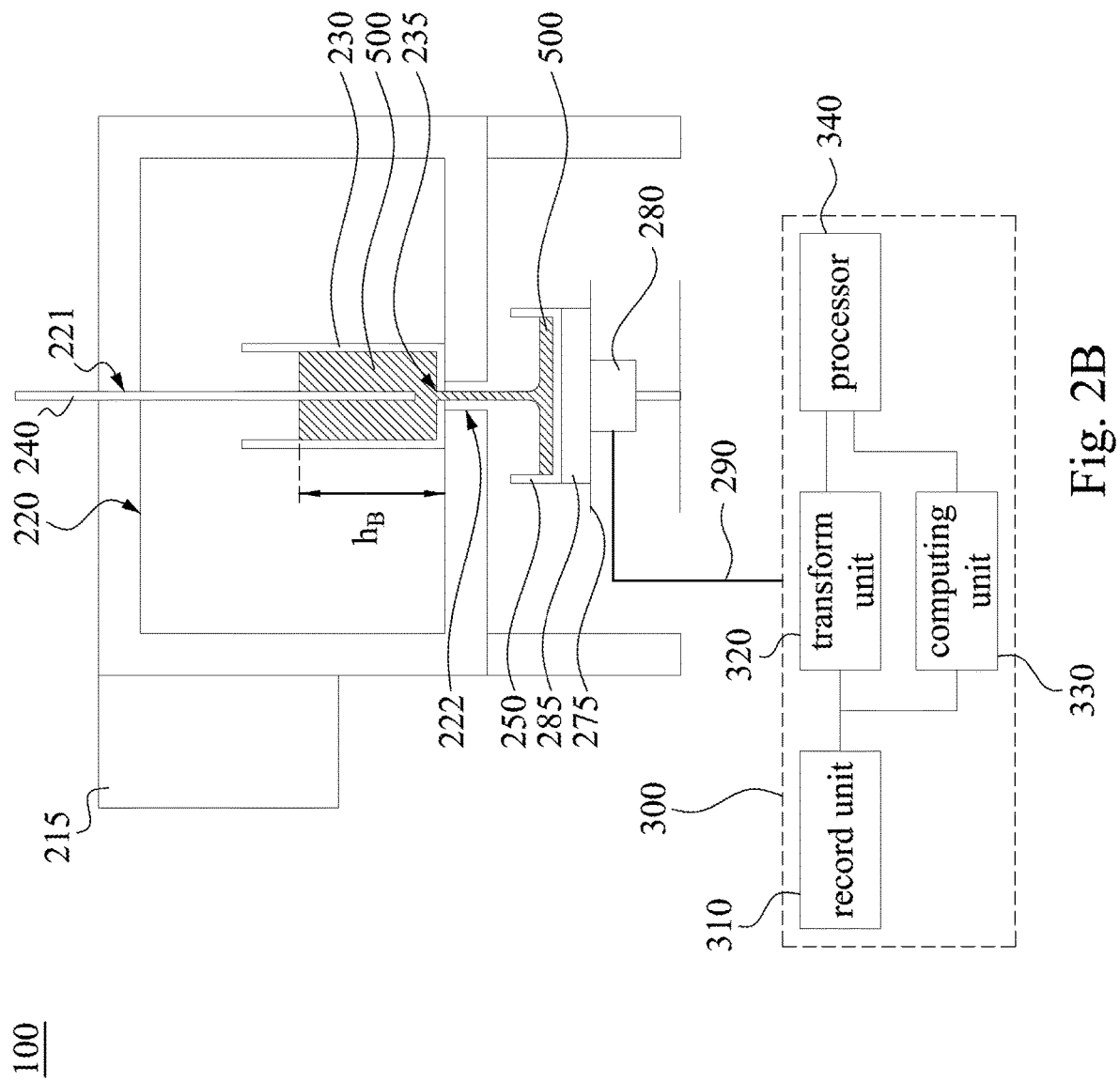
FIG. 2B illustrates a schematic view of the measuring device during a physical property measuring process according to one embodiment of this disclosure.
Figure 3:
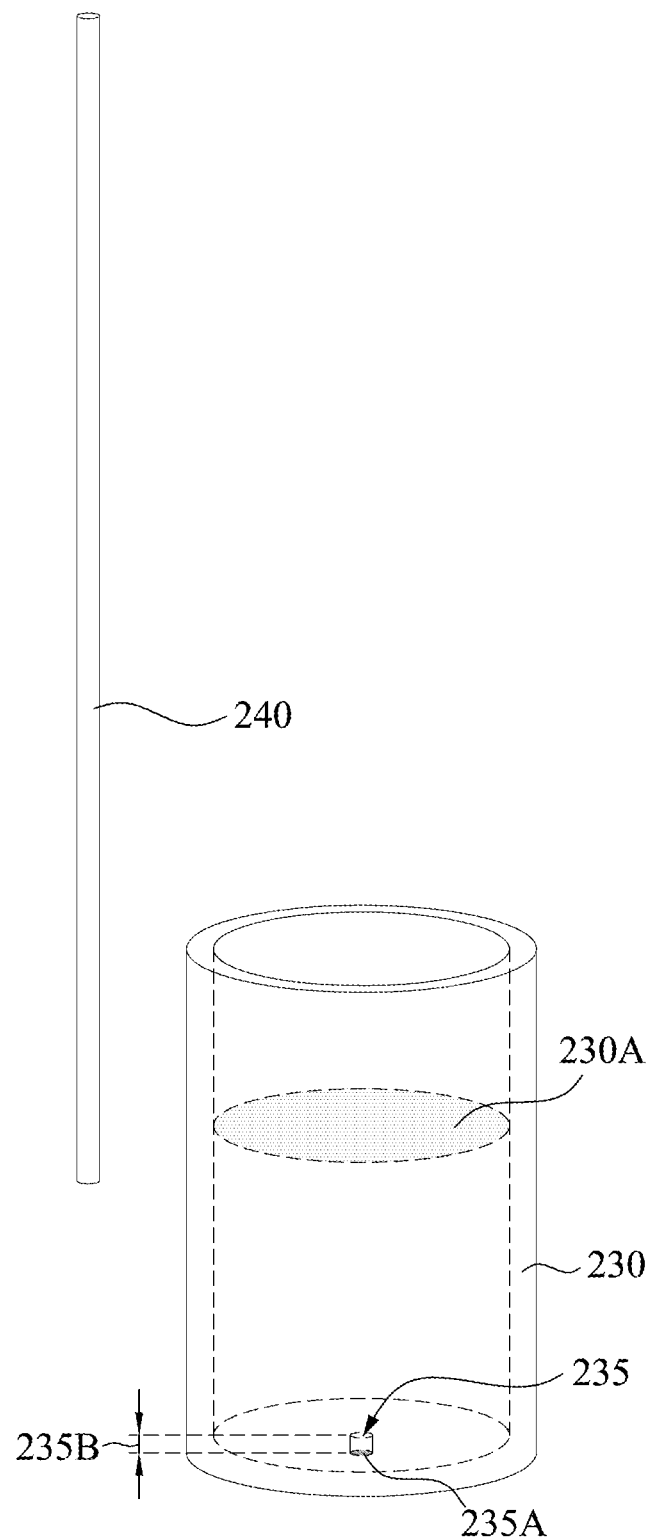
FIG. 3 illustrates perspective views of a draining vessel and a stopper according to one embodiment of this disclosure.

Continued with FIG. 2A, FIG. 2B illustrates a schematic view of the measuring device 100 during a physical property measuring process according to one embodiment of this disclosure. FIG. 2B illustrates how the molten metal fluid 500 flows through the measuring device 100 for physical properties during measurement. In FIG. 2B, the stopper 240 is pulled out from the opening 235, so the molten metal fluid 500 flows into the loader 250 through the opening 235 and the lower channel 222 under the chamber 220. FIG. 3 illustrates perspective views of a draining vessel 230 and a stopper 240 according to one embodiment of this disclosure. In this embodiment, the draining vessel 230 is, for example, a round iron cup and has a circular opening 235, which can be blocked by the stopper 240. Thus, the draining vessel 230 has a cross-sectional area 230A, the opening 235 of the draining vessel 230 has a cross-sectional area 235A, and the opening 235 has a length 235B. It should be understood that the shape of the draining vessel and stopper of the present disclosure is not limited to this example.

Return to FIG. 2B. After the stopper 240 is pulled and the molten metal fluid 500 flows out of the draining vessel 230, the height of the molten metal fluid 500 in the draining vessel 230 drops from height $h_A$ to height $h_B$ during time t. The loader 250 accumulates the molten metal fluid 500. The load cell 280 converts the weight of the molten metal fluid 500 accumulated by the loader 250 into an electronic signal, which is transmitted to the computing system 300 for physical properties through the connecting line 290. Specifically, the accumulated molten metal fluid 500 in the loader 250 can provide a weight accumulation information, which is a function of time period t indicating that a weight w(t) of the molten metal fluid 500 accumulated on the loader 250 at time t.

After the computing system 300 for physical properties obtains the weight w(t) of the accumulated molten metal fluid 500, it can further calculate to obtain the physical properties of the molten metal fluid 500. The specific calculation process will be further explained in the following discussion. The specific functions of units in the computing system 300 for physical properties are describes as follows.

In the following computations, the computing system 300 for physical properties receives the weight w(t) of the molten metal fluid 500 accumulated in the loader 250 and assume physical parameters of the accumulated molten metal fluid 500. In some embodiments, the assumed physical parameters of the accumulated molten metal fluid 500 includes a density $\rho$, a viscosity $\eta$ and a surface tension $\sigma$.

The recording unit 310 is used to record the vessel information of the draining vessel 230 in the furnace 210 of the measuring device 100 for physical properties. Specifically, in this embodiment, the vessel information includes a cross-sectional area 230A of the draining vessel 230, a cross-sectional area 235A of the opening 235 and the length 235B. of the opening 235.

The transform unit 320 is used to convert the weight w(t) of the molten metal fluid 500 accumulated in the loader 250 into the first length criterion of the molten metal fluid 500 in the draining vessel 230 through the assumed physical parameters and vessel information. For example, if the physical parameters include density p, and a total weight of the molten metal fluid 500 in the loader 250 is known, the weight w(t) of the molten metal fluid 500 in the loader 250 and the density p can be used to obtain the volume of the molten metal fluid 500 in the draining vessel 230. The transform unit 320 can receive information such as the cross-sectional area 230A of the draining vessel 230 and so on, and liquid level of the molten metal fluid 500 in the draining vessel 230 can be further obtained as the first length criterion. The above example is taken as an embodiment of the first length criterion but not limits to the type of the first length criterion.

Compared with the transform unit 320, the function of the computing unit 330 is to calculate and simulate the fluid characteristics of the molten metal fluid 500 based on the assumed physical parameters and the vessel information without relying on the weight w(t) of the molten metal fluid 500 obtained by measurement to obtain a second length criterion occupied by the molten metal fluid 500 in the draining vessel 230. For example, the second length criterion, the computing unit 330 can also calculate and simulate liquid level of the molten metal fluid 500 in the draining vessel 230. The above example is taken as an embodiment of the second length criterion but not limits to the type of the second length criterion. The first length criterion and the second length criterion are the same physical quantity, and the difference between the first length criterion and the second length criterion can be further obtained later.

The function of the processor 340 is to integrate the first length criterion and the second length criterion. The processor 340 adjusts the assumed physical parameters (e.g., density ρ, a viscosity η and a surface tension σ) to minimize the difference between the first length criterion and the second length criterion. When the difference between the first length criterion and the second length criterion is minimized, the current physical parameters at this time can be selected as the physical properties of the molten metal fluid 500 in the chamber 220 of the furnace 210.

Figure 4:
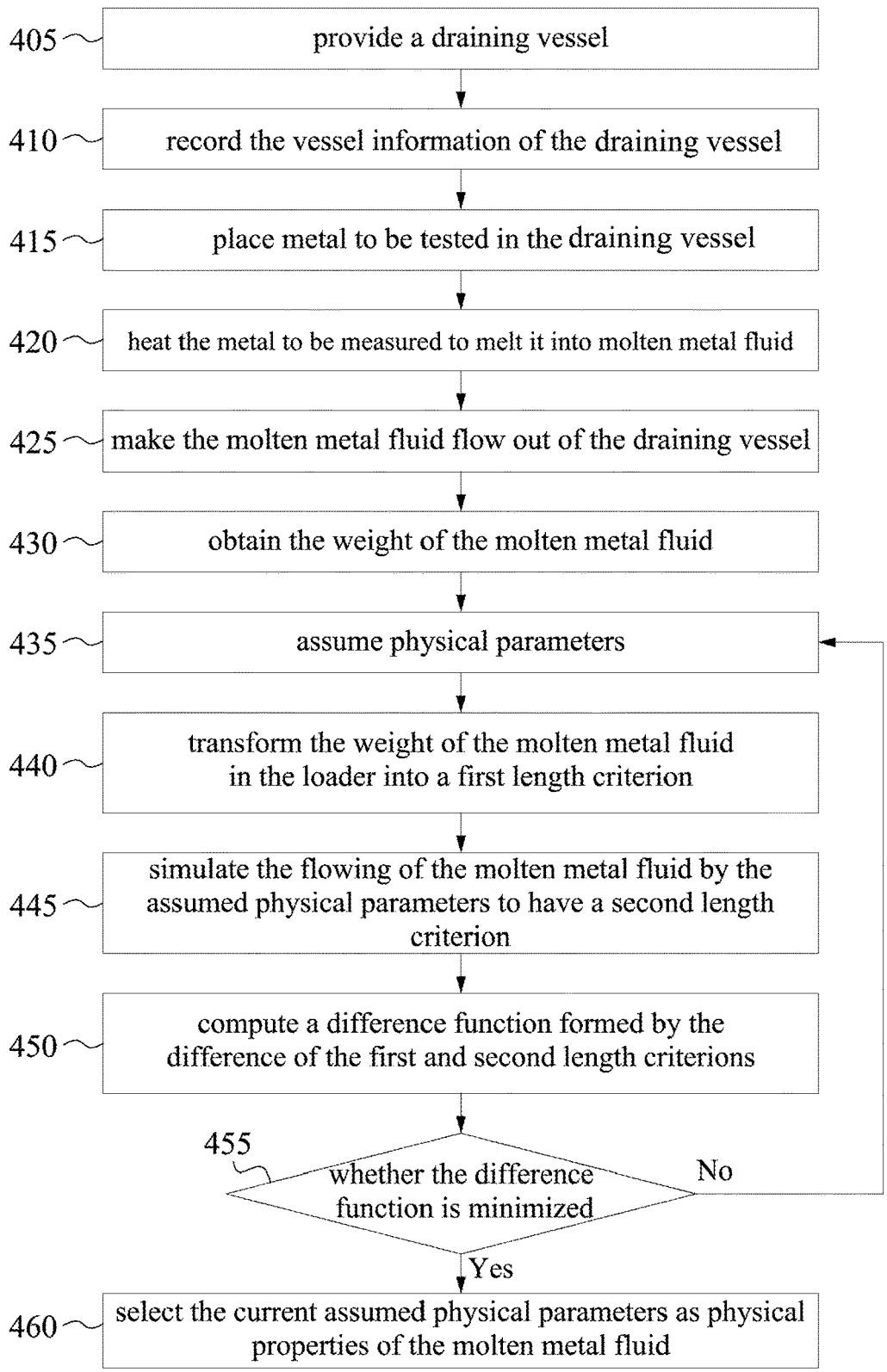
FIG. 4 illustrates a flow chart of a method of physical property measuring according to one embodiment of this disclosure.

To specifically illustrate the actual operations of the computing system 300 for physical properties, FIG. 4 illustrates a flow chart of a method 400 of physical property measuring according to one embodiment of this disclosure, and FIG. 4 illustrates that what is the first length criterion of the transform unit 320 and the second length criterion of the computing unit 330 and how the processor 340 specifically integrates the first length criterion and the second length criterion in the computing system 300 for physical properties.

Reference is made by FIG. 2A and FIG. 4. In operation 405 of the method of physical properties measuring, a draining vessel 230 is provided and configured in a chamber of a furnace 210, wherein an opening 235 of the draining vessel 230 is aligned with a lower channel of the chamber 220. The opening of the draining vessel 230 is sealed by a stopper 240.

In operation 410, record vessel information of the draining vessel 230 through a recording unit 310 of the computing system 300 for physical properties. As mentioned above, the vessel information of the draining vessel 230 includes a cross-sectional area 230A of the draining vessel 230, a cross-sectional area 235A of the opening 235 and the length 235B. of the opening 235.

In operation 415, place metal to be measured in the draining vessel 230 and seal the chamber 220. As shown in FIG. 2A, in operation 420, heat the metal to be measured to melt it into molten metal fluid 500.

Through operations 405-420, the molten metal fluid 500 is already located in the draining vessel 230. Then, in operation 425, remove the stopper 240 form the opening 235 and make the molten metal fluid 500 flow out of the draining vessel 230. As shown in FIG. 2B, the molten metal fluid 500 flowing out of the draining vessel 230 is accumulated in the loader 250.

As mentioned above, in operation 430, obtain the weight w(t) of the molten metal fluid 500 accumulated in the loader 250 through the load cell 280 of the weight measuring device 270. The weight (t) of the molten metal fluid 500 is the total weight of the molten metal fluid 500 at time t. The weight w(t) of the molten metal fluid 500 is transmitted to the computing system 300 for physical properties through the connecting line 290.

Since the molten metal fluid 500 is to be measured, the physical properties of the molten metal fluid 500 are unknown. In this embodiment, in operation 435, the computing system 300 for physical properties will first assume a set of assumed physical parameters for subsequent computation and comparison. Specifically, in this embodiment, the physical parameters of the molten metal fluid 500 include density ρ, a viscosity η and a surface tension σ.

The assumed physical parameters including density ρ, viscosity η and surface tension σ do not have to be the same as the exact physical properties to be obtained. The assumed physical parameters are similar to the initial guess given in a standard optimization process, and the assumed physical parameters can be updated and subsequently approach the real physical properties through the iterative process step by step. In some embodiments, the assumed density ρ, viscosity η and surface tension σ can be assumed with literature references, which can further reduce the total calculation time of the computing system 300 for physical properties.

The recording unit 310 of the computing system 300 for physical properties records the vessel information of the draining vessel 230 in operation 410. The vessel information includes cross-sectional area 230A of the draining vessel 230, a cross-sectional area 235A of the opening 235 and the length 235B. of the opening 235. In operation 430, the computing system 300 for physical properties obtains the weight w(t) of the molten metal fluid 500 accumulated on the loader 250 through the load cell 280.

In the operation 435, the computing system 300 for physical properties assumes physical parameters of the molten metal fluid 500, and the assumed physical parameters including density ρ, viscosity η and surface tension σ. Then, please refer to following discussion to have the details of the first length criterion converted by the transform unit 320 and the second length criterion calculated by the computing unit 330.

In this embodiment, the first length criterion and the second length criterion are respectively referred to the first height head $h_1(t;\rho,\eta,\sigma)$ and the second height head $h_2(t;\rho,\eta,\sigma)$. The first height head $h_1(t;\rho,\eta,\sigma)$ and the second height head $h_2(t;\rho,\eta,\sigma)$ are functions of time t. The first height head $h1(t;\rho,\eta,\sigma)$ and the second height head $h_2(t;\rho,\eta,\sigma)$ are also functions and the physical parameters of the molten metal fluid 500, wherein the physical parameters of the molten metal fluid 500 includes density ρ, viscosity η and surface tension σ. For measuring device 100, the height head refers to the liquid level of the molten metal fluid 500 in the draining vessel 230, such as the height $h_A$ illustrated in FIG. 2A and the height head $h_B$ illustrated in FIG. 2B. In this embodiment, since the molten metal fluid 500 to be measured can be solid at room temperature, the total weight of the molten metal fluid 500 can be obtained before setting. Subsequently, the solid metal is heated into the molten metal fluid 500 in the chamber 220 of the furnace 210.

After the chamber 220 is sealed by the door 225 (see FIG. 1), when the molten metal fluid 500 flows out from the opening 235, the information about the liquid level of the molten metal fluid 500 in the draining vessel 230 cannot be directly obtained. In this embodiment, the weight w(t) of the molten metal fluid 500 accumulated in the loader 250 can be used to indirectly obtain the liquid level of the molten metal fluid 500 in the draining vessel 230. The liquid level of the molten metal fluid 500 in the draining vessel 230 is converted by the transform unit 320. The liquid level converted by the transform unit 320 is the first height head $h_1(t;\rho,\eta,\sigma)$. Since the weight w(t) of molten metal fluid 500 is a function of time t, the first height head $h_1(t;\rho,\eta,\sigma)$ is also a function of time t.

Specifically, in the operation 440, using the assumed physical parameters including the assumed density ρ, viscosity η and surface tension σ of the molten metal fluid 500, the transform unit 320 converts the weight w(t) of the molten metal fluid into the volume of molten metal fluid 500 accumulated in the loader 250. Since the total weight of the molten metal fluid 500 and the volume of the molten metal fluid 500 accumulated in the loader 250 related to the time tare known, the volume of the molten metal fluid 500 in the draining vessel 230 with time period t can be obtained.

Further, the transform unit 320 is connected to the recording unit 310 to receive the vessel information of the draining vessel 230. The vessel information includes the cross-sectional area 230A of the draining vessel 230, and the cross-sectional area 235A and the length 235B of the opening 235 of the draining vessel 230. Through the cross-sectional area 235A and the length 235B of the opening 235, the volume occupied by the opening 235 can be obtained.

Based on given the relationship between the volume of the molten metal fluid 500 in the draining vessel 230 and the time t, the volume occupied by the opening 235 and the cross-sectional area 230A of the draining vessel 230, the transform unit 320 convert the weight of the molten metal fluid 500 into the a liquid level of the molten metal fluid 500 in the draining vessel 230. The converted liquid level of the molten metal fluid 500 in the draining vessel 230 is regarded as the first height head $h_1(t;\rho,\eta,\sigma)$, which is used as the first length criterion in the following calculations. It should be noted that, the first height head $h_1(t;\rho,\eta,\sigma)$ is not an accurate solution since density $\rho$, viscosity $\eta$ and surface tension $\sigma$ are assumed physical parameters. The first height head $h_1(t;\rho,\eta,\sigma)$ can vary with updated density $\rho$, viscosity $\eta$ and surface tension $\sigma$.

In operation 445, the computing unit 330 can obtain the theoretical second height head $h_2(t;\rho,\eta,\sigma)$ through calculation and simulation. In other words, the computing unit 330 simulates the flowing of the molten metal fluid 500 by the assumed physical parameters to have the theoretical second height head $h_2(t;\rho,\eta,\sigma)$, which is the second length criterion. Specifically, in this embodiment, the computing unit 330 is a computational fluid dynamics unit, which performs the numerical simulation of the molten metal fluid 500 through a Computational Fluid Dynamics (CFD) algorithm. As mentioned above, the computing unit 330 can receive given the assumed physical parameters including density $\rho$, viscosity $f$ and surface tension $\sigma$, and the computing unit 330 connected to the recording unit 310 to have the vessel information of the draining vessel 230, wherein the vessel includes the cross-sectional area 230A of the draining vessel 230 and the cross-sectional area 235A and the length 235B of the opening 235 of the draining vessel 230. Therefore, the computing unit 330 can simulate the liquid level of the molten metal fluid 500 in the draining vessel 230 through computational fluid dynamics. The simulated liquid level of the molten metal fluid 500 in the draining vessel 230 can be regarded as the second height head $h_2(t;\rho,\eta,\sigma)$.

Computational Fluid Dynamics is a numerical method to solve fluid dynamics equations. Specifically, in some computational fluid dynamics algorithms, the fluid system under consideration can be divided into multiple connected small volumes (or called "grids") in space. For each adjacent small volume, the Navier-Stokes equations of the fluid in the corresponding volume and the continuity equation of the fluid itself can be calculated by numerical. Computational Fluid Dynamics is a mature technology, and it can accurately calculate various fluid flow conditions when the physical properties of the fluid are known. Computational Fluid Dynamics has been widely used in the aerospace field, for example. As the current computational fluid dynamics technology has matured, there is package software in the world that can be used to construct the computing unit 330. In this embodiment, since the physical parameters of the molten metal fluid 500 to be measured are assumed, for each time t, the second height head $h_2(t;\rho,\eta,\sigma)$ calculated by the computing unit 330 is a function of density $\rho$, viscosity $\eta$ and surface tension $\sigma$.

Continued with operations 440 and 445, in operation 450, under the premise of obtaining the first height head $h_1(t;\rho,\eta,\sigma)$ and the second height head $h_2(t;\rho,\eta,\sigma)$, the processor 340 of the computing system 300 of the measuring device 100 establishes and computes a difference function $\Delta(\rho,\eta,\sigma)$ formed by the difference of the first height head $h_1(t;\rho,\eta,\sigma)$, (which is the first length criterion) and the second height head $h_2(t;\rho,\eta,\sigma)$, (which is the second length criterion).

Specifically, the first height head $h_1(t;\rho,\eta,\sigma)$ and the second height head $h_2(t;\rho,\eta,\sigma)$ are both functions of time t. At a specific time t, the difference between the first height head $h_1(t;\rho,\eta,\sigma)$ and the second height head $h_2(t;\rho,\eta,\sigma)$ can be expressed as the following squared difference (1):

$$h_1(t;\rho,\eta,\sigma)-h_2(t;\rho,\eta,\sigma))^2 \qquad (1)$$

In this embodiment, summarize the squared difference (1) for each different time to construct the difference function $\Delta(\rho,\eta,\sigma)$ during a complete measurement time period T:

$$\Delta(\rho,\eta,\sigma)=\Sigma_{t=0}^{T}(h_1(t;\rho,\sigma,\eta)-h_2(t;\rho,\sigma,\eta))^2 \qquad (2)$$

Continued with operation 450, in operation 455, determine whether the difference function $\Delta(\rho,\eta,\sigma)$ is minimized. After the processor 340 calculates the difference function $\Delta(\rho,\eta,\sigma)$ in the equation (2), the processor 340 further checks whether the difference function $\Delta(\rho,\eta,\sigma)$ is minimized. When the difference function $\Delta(\rho,\eta,\sigma)$ is minimized, it means that in a complete measurement time period T, difference between the first height head $h_1(t;(\rho,\eta,\sigma)$ and the second height head $h_2(t;\rho,\eta,\sigma)$ is minimized, and the second height head $h_2(t;\rho,\eta,\sigma)$ simulated by computational fluid dynamics is the same as the first height head $h_1t(\rho,\eta,\sigma)$. Since the simulation of Computational Fluid Dynamics has considerable credibility, if the Computational Fluid Dynamics has sufficiently accurate result, it is that in the first height head $h_1(t;\rho,\eta,\sigma)$ can be also sufficiently accurate.

Since the first height head $h_1(t;\rho,\eta,\sigma)$ is converted according to the measured weight w(t) of the molten metal fluid 500 accumulated in the loader 250, the first height head $h_1(t;(\rho,\eta,\sigma)$ corresponds to the assumed physical parameters including density $\rho$, viscosity $\eta$ and surface tension $\sigma$. If the first height head $h_1(t;\rho,\eta,\sigma)$ are accurate, it can have accurate physical parameter similar to real physical properties of the molten metal fluid 500. By adjusting and updating the assumed density $\rho$, viscosity $\eta$ and surface tension $\sigma$ to minimize the difference function $\Delta(\rho,\eta,\sigma)$, and accurate physical properties of molten metal fluid 500 can be obtained.

Therefore, in operation 455, the processor 340 deals with a standard optimization problem: whether the difference function $\Delta\rho,\eta,\sigma)$ is minimized based on the given assumed physical parameters including density $\rho$, viscosity $\eta$ and surface tension $\sigma$. If not, return to operation 435 to reset/update the assumed physical parameters. The condition for determining whether the difference function $\Delta(\rho,\eta,\sigma)$ is minimized can be preset to obtain the desired accuracy. For example, if the difference function $\Delta(\rho,\eta,\sigma)$ is less than a determined value, it can be determine that the difference function $\Delta(\rho,\eta,\sigma)$ is minimized.

If the difference function $\Delta(\rho,\eta,\sigma)$ is minimized, the current physical parameters (e.g., assumed density $\rho$, viscosity $\eta$ and surface tension $\sigma$) of the assumed physical parameters can be regarded as accurate physical properties of the object to be measured. In operation 460, when the difference function $\Delta(\rho,\eta,\sigma)$ has been minimized, the current physical parameters density $\rho$, viscosity $\eta$ and surface tension $\sigma$) are selected as the physical properties of the molten metal fluid 500, and the measurement is done.

In the present disclosure, it can measure the physical properties of the molten metal fluid 500 heated to a specified temperature in the furnace 210. It should be understood that it is mainly necessary to measure the weight w(t) of the molten metal fluid 500 accumulated in the loader 250 in the measuring method 400.

In some embodiments, for the convenience of measurement and the overall cost consideration, the loader 250 and the weight measuring device 270 are both installed outside the furnace 210. The weight measuring device 270 cannot have high heat resistance, and only a heat insulating plate 285 located between the weight measuring device 270 and the loader 250, as shown in FIG. 2A. Even though the molten metal fluid 500 inside and outside the furnace 210 has a temperature difference, the measuring device 100 for physical properties only needs to measure the relationship between the weight w(t) of the molten metal fluid 500 accumulated in the loader and the time t. Even if the molten metal fluid 500 flows out of the furnace 210 has volume changing, the weight of molten metal fluid 500 flowing out of the furnace 210 are not change, and the measurement result will not be affected. Therefore, if the loader 250 and the weight measuring device 270 are arranged outside the furnace 210, such design can still accurately measure the physical properties of the molten metal fluid 500 in the furnace 210 and further save costs.

In some embodiments, consider a complete measurement time period T, segment optimization can be done for different height head. For example, in some embodiments, it is expected that when the molten metal fluid 500 has not flowed out too much, the estimated density ρ is more accurate; when the molten metal fluid 500 gradually flows out, the estimated viscosity η is more accurate; when all of the molten metal fluid 500 almost flows from the opening 235, the measurement of surface tension σ will be more accurate at final.

Based on the above assumption, a first time point $t_1$ and the second time point $t_2$ can be selected. The first time point $t_1$ and the second time point $t_2$ are both included in the measurement time period T, and the first time point $t_1$ is before the second time point $t_2$. The processor 340 can divide the total measurement time period T into the first time period $(0<t<t_1)$ and the second time period $(t_1<t<t_2)$ and the third period $(t_2<t<T)$ in order according to the first time point $t_1$ and the second time point $t_2$. For each of the first time period $(0<t<t_1)$, the second time period $(t_1<t<t_2)$ and the third period $(t_2<t<T)$, it can construct corresponding a first difference function $\Delta_1(\rho,\eta,\sigma)$, a second difference functions $\Delta_2(\rho,\eta,\sigma)$ and a third difference functions $\Delta_3(\rho,\eta,\sigma)$, which can combine to form the mentioned difference function $\Delta(\rho,\eta,\sigma)$.

Specifically, according to the above dividing way, the first time period $(0<t<t_1)$ corresponds to the first difference function $\Delta_1(\rho,\eta,\sigma)$ shown below:

$$\Delta_1(\rho,\eta,\sigma)=\Sigma_{t=0}^{t_1}((t;(\rho,\sigma,\eta)-h_2(t;\rho,\sigma,\eta))^2 \quad (3);$$

the second time period $(t_1<t<t_2)$ corresponds to the second difference functions $\Delta_2(\rho,\eta,\sigma)$ shown below:

$$\Delta_2(\rho,\eta,\sigma)=\Sigma_{t=t_1}^{t_2}(h_1(t;(\rho,\sigma,\eta)-h_2(t;\rho,\sigma,\eta))^2 \quad (4);$$

and the third period $(t_2<t<T)$ corresponds to the third difference functions $\Delta_3(\rho,\eta,\sigma)$ shown below:

$$\Delta_3(\rho,\eta,\sigma)=\Sigma_{t=t_2}^{T}(h_1(t;\rho,\sigma,\eta)-h_2(t;\rho,\sigma,\eta))^2 \quad (5)$$

According to the definition of equation (2), the mentioned difference function $\Delta(\rho,\eta,\sigma)$ is the sum of the first difference function $\Delta_1(\rho,\eta,\sigma)$, the second difference functions $\Delta_2(\rho,\eta,\sigma)$ and the third difference functions $\Delta_3(\rho,\eta,\sigma)$:

$$\Delta(\rho,\eta,\sigma)=\Delta_1(\rho,\eta,\sigma)+\Delta_2(\rho,\eta,\sigma)+\Delta_3(\rho,\eta,\sigma) \quad (6)$$

The processor 340 can be made to minimize the above three difference functions and select physical properties. After minimizing the first difference function $\Delta_1(\rho,\eta,\sigma)$, select the density ρ; minimize the second difference function $\Delta_2(\rho,\eta,\sigma)$, select the viscosity η; minimize the third difference function $\Delta_3(\rho,\eta,\sigma)$, select the surface tension σ. Through the above three-stage minimization, the overall difference function $\Delta(\rho,\eta,\sigma)$ can be minimized in another way, and accurate physical properties can be obtained.

Regarding the selection of the first time point $t_1$ and the second time point $t_2$, for example, the total measurement time period T can be equally divided into three equal parts at the first time point $t_1$ and the second time point $t_2$. The above example is only one of the embodiments, and is not intended to limit the selection of the first time point $t_1$ and the second time point $t_2$ of the present disclosure.

In some embodiments, the divided first time period, second time period, and third time period are not limited to dividing the complete measurement time period T equally. For example, in some embodiments, the total measurement time period T is not covered by the three time periods of the first time period, the second time period, and the third time period. In some embodiments, the first time period, the second time period, and the third time period can partially overlap each other or even completely overlap. For example, in some embodiments, the second period is the same as the first period. In some embodiments, the second period is the same as the third period. In other words, this means that two different physical parameters can be accurately obtained in the same time period. In the case of the above non-equally divided complete measurement time period T, the corresponding first difference function $\Delta_1(\rho,\eta,\sigma)$, the second difference function $\Delta_2(\rho,\eta,\sigma)$, and the third difference function $\Delta_3(\rho,\eta,\sigma)$, can be constructed and minimized in stages according to the selected time ranges, thereby accurate physical properties can be obtained.

It should be understood that in the above-mentioned difference function $\Delta(\rho,\eta,\sigma)$, formed by the squared difference of the first height head $h_1(t;\rho,\eta,\sigma)$ and the second height head $h_2(t;\rho,\eta,\sigma)$, is only an example but not to limits to the present disclosure. For example, the difference function $\Delta(\rho,\eta,\sigma)$ can also be constructed using the mathematical form of absolute value.

In summary, the present disclosure provides a measuring device with a simple structure for physical properties and a corresponding method for physical property measuring under consideration of high-temperature molten fluid with quite viscosity. The metal to be measured can be placed in the draining vessel in a solid state. When the molten metal fluid to be measured is heated to a specified temperature, the molten metal fluid can flow out of the furnace. The molten metal fluid is accumulated in the loader outside the furnace to obtain corresponding weight accumulation information. Although the temperature inside and outside the furnace are different, the measuring device for physical properties of the present disclosure only needs to obtain the weight of the molten metal fluid flowing out over time, it is not necessary to configure the weight measuring device in the furnace, and it effectively reduces the need for heat resistance of the weight measurement and costs. In addition, the measuring device for physical properties is combined with the computing system for physical properties, only the weight accumulation information is obtained in the measurement, and the physical properties of the molten metal fluid can be obtained through the optimization algorithm. The method for physical property measuring of the present disclosure can obtain the physical properties of the molten metal fluid including density, viscosity, and surface tension at the same time through an optimized algorithm. The present disclosure further provides a multi-stage optimization method that can obtain density, viscosity, and surface tension at different optimization stages. The above-mentioned multi-stage optimization method combined with physical analysis will be able to obtain accurate measurement results efficiently.

What is claimed is:

1. A measuring device for measuring physical properties of a molten metal fluid comprising:
    a furnace having a chamber;
    a draining vessel located in the chamber and having an opening, wherein the draining vessel is configured to accommodate the molten metal fluid;
    a loader aligned with the opening to accumulate the molten metal fluid from the draining vessel during a time period; and
    a computing system for providing the physical properties, wherein the computing system comprises:
        a recording unit recording a vessel information of the draining vessel;
        a transform unit configured to transform a weight of the molten metal fluid accumulated in the loader during the time period into a first length criterion;
        a computing unit configured to simulate flowing of the molten metal fluid to have a second length criterion by assumed physical parameters of the molten metal fluid and the vessel information; and
        a processor configured to minimize a difference function of the first and the second length criterions by changing the assumed physical parameters of the molten metal fluid, wherein current physical parameters of the assumed physical parameters of the molten metal fluid are determined as the physical properties of the molten metal fluid when the difference function is minimized.

2. The measuring device of claim 1, wherein the assumed physical parameters of the molten metal fluid comprises a density, a viscosity and a surface tension.

3. The measuring device of claim 1, wherein the vessel information comprises a cross-section area of the draining vessel, a cross-section area of the opening and a length of the opening.

4. The measuring device of claim 1, wherein the computing unit is a computational fluid dynamics unit, the computational fluid dynamics unit provides the second length criterion by a computational fluid dynamics algorithm.

5. The measuring device of claim 1, wherein the first and second length criterions are a first height head and a second height head respectively, the first and second height head are functions of time, the first height head is a liquid level transformed by the weight of the molten metal fluid in the draining vessel, the second height head is another liquid level of the molten metal fluid in the draining vessel, and the second height head is simulated by the computing unit.

6. The measuring device of claim 1, further comprising a weight measuring device, wherein the loader is disposed on the weight measuring device, the loader and the weight measuring device are located out of the chamber, the chamber comprises a channel, and the opening is aligned with the loader by the channel.

7. The measuring device of claim 6, wherein a heat insulation plate is located between the weight measuring device and the loader.

8. A method of physical property measuring comprising:
    providing a draining vessel and recording a vessel information of the draining vessel;
    placing metal to be measured in the draining vessel;
    heating the metal to be measured to melt it into molten metal fluid;
    making the molten metal fluid flow out of the draining vessel and be accumulated in a loader during a time period to obtain a weight of the molten metal fluid;
    providing an assumed physical parameters of the molten metal fluid;
    transforming the weight of the molten metal fluid in the loader into a first length criterion in the draining vessel by a transform unit according to the assumed physical parameters of the molten metal fluid and the vessel information;
    simulating flowing of the molten metal fluid by the assumed physical parameters of the molten metal fluid to have a second length criterion in the draining vessel by a computing unit according to the assumed physical parameters of the molten metal fluid and the vessel information;
    computing a difference function formed by the difference of the first and second length criterions; and
    minimizing the difference function by a processor, wherein current physical parameters of the assumed physical parameters of the molten metal fluid are selected as physical properties of the molten metal fluid when the difference function is minimized.

9. The method of claim 8, wherein the first and second length criterions are a first height head and a second height head respectively, the first and second height head are functions of time, the first height head is a liquid level transformed by the weight of the molten metal fluid in the draining vessel, the second height head is another liquid level of the molten metal fluid in the draining vessel, and the second height head is simulated by the computing unit.

10. The method of claim 9, wherein the assumed physical parameters of the molten metal fluid comprising a density, a viscosity and a surface tension, wherein the method further comprises:
    dividing the time period into first, second and third time periods sequentially and computing corresponding first, second and third difference functions of the difference function according to the first and second height heads, wherein the first time period precedes the second time period, and the second time period precedes the third time period; and
    the operation of minimizing the difference function by the processor further comprise:
        minimizing the first difference function to select the density of the molten metal fluid;
        minimizing the second difference function to select the viscosity of the molten metal fluid; and
        minimizing the third difference function to select the surface tension of the molten metal fluid.

* * * * *